Aug. 27, 1946.   J. M. MAVITY   2,406,622
CONVERSION OF HYDROCARBONS
Filed Nov. 8, 1943
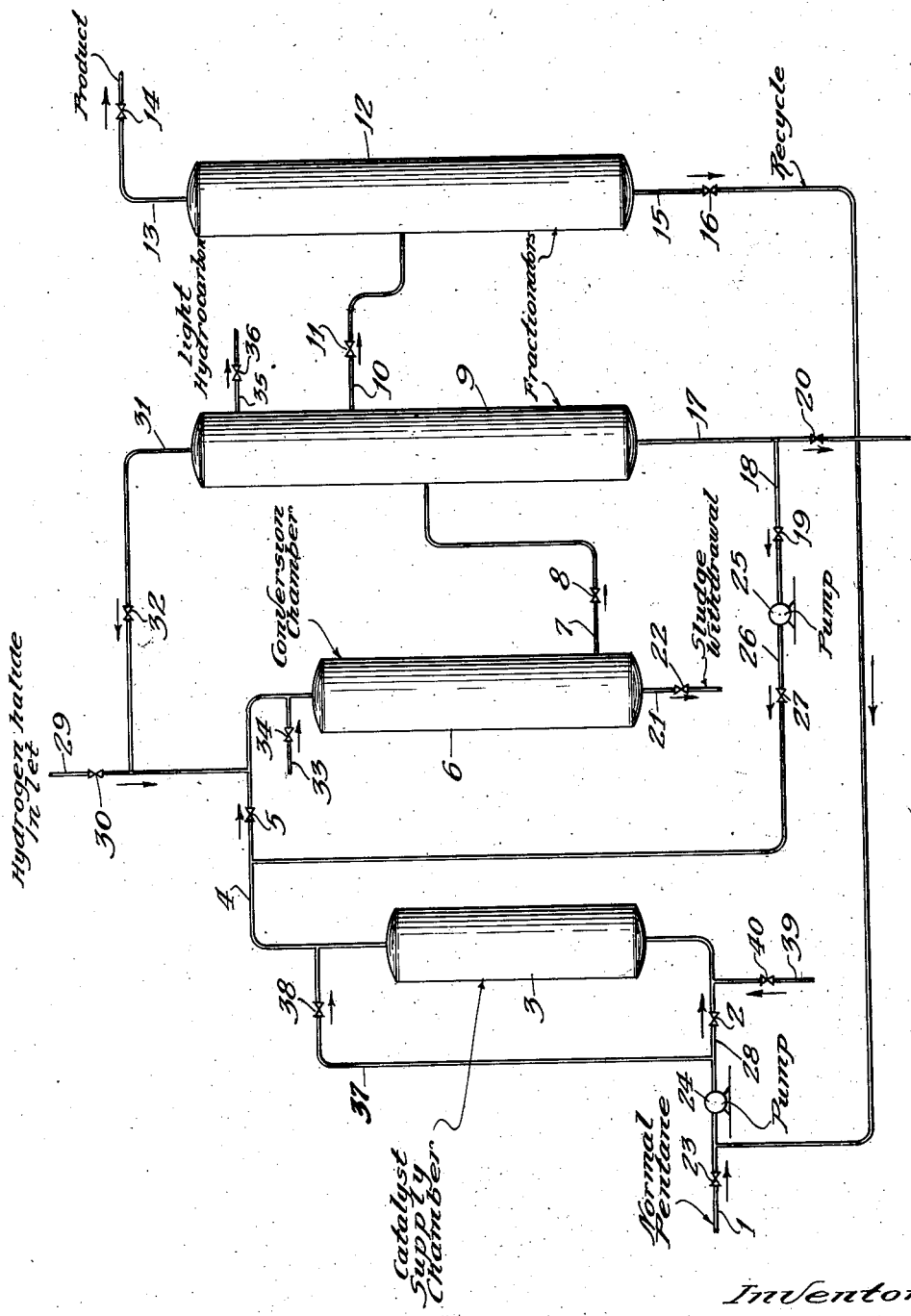
Inventor:
Julian M. Mavity
By Lee J. Gary
Attorney Patented Aug. 27, 1946

2,406,622

UNITED STATES PATENT OFFICE 2,406,622

CONVERSION OF HYDROCARBONS

Julian M. Mavity, Riverside, Ill., assignor to Universal Oil Products Company, Chicago, Ill., a corporation of Delaware Application November 8, 1943, Serial No. 509,412

6 Claims. (Cl. 260—683.4)

This invention relates to the catalytic conversion of hydrocarbons and is more specifically concerned with an improved catalytic process wherein the catalyst employed comprises an aluminum halide.

Aluminum halide catalyst such as aluminum chloride and bromide are well known in the art as catalysts which accelerate hydrocarbon conversion reactions such as isomerization, alkylation and cracking. These catalysts have been employed in the solid granular state or have been deposited upon solid supporting materials and disposed in a confined reaction zone through which the hydrocarbon reactants are passed. More recently these catalysts have been employed in processes wherein at least a portion of the hydrocarbon charging stock is passed through a bed of granular catalyst disposed within a catalyst supply zone, said zone being maintained under conditions such that at least a portion of the catalyst is dissolved in the hydrocarbon and the resulting solution introduced into a reaction zone wherein the desired conversion is obtained. One of the difficulties of this latter type of operation is the fact that under the conditions necessary in the catalyst supply zone to effect the solution of at least a portion of the catalyst in the hydrocarbon stream, some reaction often occurs between the catalyst and the hydrocarbons and as a result of this action, a high molecular weight hydrocarbon catalyst complex is formed.

This hydrocarbon-catalyst complex while possessing some catalytic activity is not as active as the granular aluminum halide. In fact, the activity of complex appears to be dependent upon the concentration of aluminum halide in said complex. Therefore, the formation of this complex in the catalyst supply zone increases to a considerable extent the catalyst consumption per unit of hydrocarbon converted.

A further advantage in the operation is obtained by preventing complex formation in the catalyst supply zone. The complex formed is relatively insoluble in the hydrocarbon stream and a coating gradually accumulates on the residual granular catalyst. The presence of this insoluble coating on the catalyst prevents efficient contact between the hydrocarbon catalyst and retards the solution of aluminum halide in the hydrocarbon stream. The catalyst concentration in the hydrocarbon stream leaving the catalyst supply zone is gradually decreased necessitating various changes in the operating conditions to maintain a constant catalyst withdrawal.

It is an object of the present invention to provide an improved process wherein the formation of the hydrocarbon catalyst complex in the catalyst supply zone is substantially eliminated, thereby eliminating the difficulties discussed above.

In one broad aspect, the present invention comprises passing at least a portion of a saturated hydrocarbon charge in substantial liquid phase through a bed of aluminum halide and a metal selected from the group consisting of iron, aluminum, magnesium, tin, cadmium, nickel, copper and zinc under conditions such that at least a portion of the aluminum halide is dissolved in the hydrocarbon, passing the resulting solution into a reaction zone and therein effecting the conversion of a substantial portion of the hydrocarbon.

I have found that the presence of a metal such as iron, aluminum, magnesium, tin, cadmium, nickel, copper or zinc in the catalyst supply zone effectively inhibits the formation of hydrocarbon-catalyst complexes in the supply zone. The exact reason for the inhibiting action of these metals is not known but as shown in the examples included hereinafter in this specification, this inhibiting effect is substantial.

The improved process of the present invention is applicable in general to hydrocarbon conversion reactions employing aluminum halides as catalysts but is particularly applicable to such reactions as isomerization of saturated hydrocarbons such as pentane, hexane, heptane, methyl cyclohexane, etc., alkylation of alkylatable saturated hydrocarbons such as isoparaffins with alkylating agent such as olefins and cracking of higher boiling hydrocarbons to lower boiling saturated hydrocarbons.

It is obvious that the operating conditions employed in the reaction zone will vary depending upon the hydrocarbon charge and the particular reaction desired. However, since substantially no reaction is effected in the catalyst supply zone, the conditions employed in said zone are dependent primarily upon the catalyst being employed. When employing aluminum chloride as a catalyst, the temperature will fall within the general broad range of about 100 to 300° F. under a pressure sufficient to maintain the hydrocarbon in a liquid phase in the saturator to effect the solution of the catalyst in the hydrocarbon. Somewhat lower temperatures can be employed when using aluminum bromide as the catalyst since this catalyst is much more soluble than aluminum chloride in hydrocarbons. Temperatures will ordinarily vary within the range from about room temperature to about 200° F.

In effecting the conversion reaction in the reaction zone, for the best results it is necessary to have a catalyst activator present such as hydrogen chloride or hydrogen bromide. The concentration of the activator present in the reactants is dependent upon the reaction desired. For isomerization, the concentration is ordinarily within the range of about 1 to 40 mol per cent of the hydrocarbon charge and preferably from about 5 to 20 mol per cent. For alkylation, the hydrogen halide concentration is somewhat lower being of the order of 0.5 to about 10 mol per cent of the charge and preferably within the range of about 1 to 3 mol per cent of the charge, while for cracking the concentration may fall within the broad range mentioned above for isomerization.

The conditions of temperature and pressure employed in the reaction zone are dependent upon the catalyst, type of hydrocarbon charge and the hydrogen halide concentrations and the particular reaction desired. For isomerization, the temperature will vary within the range of from about room temperature to about 300° F. and preferably within the range of about 100 to 250° F. For alkylation of paraffins such as isobutane with olefins such as butylene and propylene, the temperature will vary from about room temperature to about 150° F. Considerably higher temperatures may be employed for catalytic cracking of hydrocarbon mixtures such as gasoline fractions, kerosenes and gas oils. These temperatures will ordinarily be within the range of about 150 to about 750° F.

The reaction in the conversion zone may be conducted in either the liquid, mixed or vapor phase depending upon the pressure employed. Pressures ranging from atmospheric to substantially superatmospheric of the order of 500 pounds or more are applicable.

The features of the present invention will be more fully discussed in the accompanying drawing which illustrates in conventional side elevation one type of apparatus in which the objects of the invention can be accomplished. For simplification, the description of the drawing is limited to the isomerization of normal pentane. However, it is not intended that this description place any undue limitations on the broad application of the invention, since as previously pointed out it is applicable to the conversion of hydrocarbons in general.

Referring to the drawing, the charging stock, in this instance normal pentane is introduced through line 1 containing valve 23 along with recycle from line 15 obtained as hereinafter set forth into the suction of pump 24 which discharges through line 28 containing valve 2 into catalyst supply tower 3 wherein it contacts a granular bed of analuminum halide and a metal selected from the group consisting of iron, aluminum, magnesium, cadmium, copper, nickel, tin and zinc, under conditions such that a portion of the aluminum halide is dissolved in the hydrocarbon. The catalyst-containing stream is withdrawn from catalyst supply chamber 3 through line 4 containing valve 5 commingled with hydrogen halide obtained as hereinafter set forth and the combined streams directed into conversion chamber 6 wherein a substantial portion of the normal pentane is isomerized into isopentane.

As an alternative method of operation, only a portion of the charge is introduced into supply chamber 3, the remaining portion by-passing the supply chamber through line 37 containing valve 38. This method of operation provides a means for regulating the amount of catalyst withdrawn in solution by controlling the amount of hydrocarbon being introduced to the chamber.

Conversion chamber 6 may comprise a large cylindrical chamber containing some means of retaining a portion of the catalysts introduced into the conversion zone through line 4. The retaining means may comprise solid packing material such as crushed firebrick, Berl saddles, Raschig rings, broken stoneware, granular alumina, granular silica-alumina composites and various other packing materials well known to those skilled in the art. As an alternative, the retaining material may comprise a liquid such as a hydrocarbon aluminum halide complex commonly termed "sludge" or a low-melting mixture of aluminum halide and other halides such as antimony, arsenic, zinc, and bismuth. In the event that a liquid is employed in conversion chamber 6 as a means for retaining a portion of the catalyst being introduced, a more satisfactory operation is obtained with the flow of hydrocarbons upwardly through the body of liquid in the conversion chamber instead of downwardly as shown in the drawing. A portion of the low melting mixture is withdrawn, and the metal halide such as antimony halide recovered and recycled to the reaction zone.

The liquid retaining mediums mentioned all exert some catalytic effect on the conversion reaction. By the retention of a portion of the catalyst introduced, the catalyst activity of the liquid present in the conversion zone is maintained at a substantially constant level.

A small amount of cyclic hydrocarbons such as benzene, toluene, xylene or cyclohexane, methyl cyclopentane, methyl cyclohexane and the like may be added to the reactants entering conversion zone 6 through line 33 containing valve 34 or into the catalyst supply tower through line 39 containing valve 40. The presence of this small amount of cyclic hydrocarbons inhibits to a considerable extent the tendency of the pentane to decompose into lower molecular weight hydrocarbons.

The reaction products comprising unconverted normal pentane, isopentane and hydrogen halide and small amounts of decomposition products are withdrawn from conversion chamber 6 through line 7 containing valve 8 and are directed into fractionator 9 wherein the unconverted normal pentane is separated from the hydrogen halide and isopentane. The hydrogen halide substantially free of hydrocarbons is withdrawn through line 31 containing valve 32 and is directed into line 29 through which it is again introduced into the reaction zone. The isopentane-normal pentane mixture is withdrawn from fractionator 9 into line 10 containing valve 11 is directed into fractionator 12 wherein a separation is effected between the unconverted normal pentane and the isopentane. The isopentane is withdrawn from fractionator 12 into line 13 containing valve 14, cooled, condensed and recovered as the product of the reaction. The unconverted normal pentane is withdrawn through line 15 containing valve 16 and recycled to the reaction zone through line 1 as previously set forth. The bottoms of fractionator 9 comprising a minor portion of the unconverted normal pentane and any heavier products of the reaction containing aluminum halide dissolved therein are withdrawn through line 17 and may be removed from the system through valve 20 or recycled to the reaction zone to line 18 containing valve 19 which directs the stream into pump 25 which discharges through line 26 containing valve 27 into line 4. A small amount of light hydrocarbons formed during the reaction in chamber 6 are withdrawn from fractionator 9 through line 35 containing valve 36 and recovered as a product of the reaction.

During the conversion reaction in chamber 6, a small portion of the hydrocarbon is converted into a complex by reacting with the catalyst. The complex is withdrawn from the conversion chamber into line 21 containing valve 22 and may be discarded or treated in various ways to recover the metallic halides contained therein. One particularly suitable way of treating the withdrawn sludge is to contact it with the charging stock to remove any soluble metal halide by dissolving it in the charge. This not only permits the recovery of a portion of the metal halide but also serves to remove impurities such as olefins from the charging stock.

The following examples are indicative of the improved results obtained in the isomerization of normal pentane when operated in accordance with the present invention.

Example I

A normal pentane charging stock is passed through the catalyst chamber containing powdered aluminum and aluminum chloride. The chamber is maintained at a temperature of 170° F. under a pressure of 400 pounds per square inch gauge. The effluent from this chamber containing about 1 pound of aluminum chloride per barrel of pentane is commingled with about 0.2 mol per cent of benzene and with hydrogen chloride in an amount sufficient to produce a stream of reactants containing about 12 mol percent hydrogen chloride. The stream of reactants is introduced into a packed reaction zone maintained at a temperature about 210° F. under a pressure of 400 pounds. The reaction products have the following analysis:

| | Mol per cent |
|---|---|
| Isopentane | 53 |
| Normal pentane | 42 |
| $C_4$ hydrocarbons | 2.0 |
| $C_6+$ | 3.0 |

After about 300 hours of operation, the catalyst in the supply chamber has substantially the same physical appearance as it had when first placed into the supply chamber.

Example II

Example I was repeated with the exception that the powdered aluminum was not introduced into the catalyst supply zone. After approximately 491.5 hours of continuous operation, the catalyst supply tower was opened and it was found that some of the aluminum chloride had been converted into a liquid complex. In calculating the actual catalyst consumption per barrel of normal pentane charged, it was found that the consumption was of the order of about 1.26 pounds per barrel as contrasted to a catalyst consumption of about 1 pound per barrel obtained in the operation described in Example I, or an increase of about 26 weight per cent.

Example III

When the operation of Example I is repeated but powdered magnesium substituted for the powdered aluminum in the catalyst supply zone, the actual catalyst consumption per barrel of isopentane in this operation is about 1.0 pound.

Example IV

A pentane charging stock containing about 5.5 mol per cent isopentane and 94.5 mol per cent normal pentane is passed through a mixture of 80 per cent by weight of aluminum chloride and 20 per cent by weight of powdered aluminum at a temperature of 170° F. and under a pressure of 500 pounds per square inch gauge. The resulting solution is commingled with hydrogen chloride in an amount equivalent to 12 mol per cent of the hydrocarbon charge and the mixture introduced into a packed reaction zone which is maintained at a temperature of 350° F. The analysis of the products resulting from the cracking reaction is as follows:

| | Mol per cent |
|---|---|
| Iso $C_4H_{10}$ | 18.9 |
| Normal $C_4H_{10}$ | 0.8 |
| Iso $C_5H_{12}$ | 28.0 |
| Normal $C_5H_{12}$ | 41.2 |
| $C_6+$ | 11.1 |

The catalyst consumption in the above reaction is about 0.94 pound per barrel of pentane charged.

Example V

When the test shown in Example IV is duplicated under substantially the same conditions with the exception that the powdered aluminum is not present in the catalyst supply zone, a catalyst consumption of about 1.96 pounds per barrel of pentane charge or an increase of about 105 per cent is obtained.

I claim as my invention:

1. In the catalytic conversion of a saturated hydrocarbon reactant wherein the reactant is commingled with a hydrogen halide promoter and subjected to conversion conditions in the presence of the promoter and an aluminum halide catalyst, the method which comprises passing at least a portion of said reactant, in liquid phase and prior to the commingling of the hydrogen halide promoter therewith, through a stationary bed of solid aluminum halide containing a metal selected from the group consisting of iron, aluminum, magnesium, tin, cadmium, nickel, copper and zinc, whereby to dissolve a portion of the solid aluminum halide in the liquid reactant while substantially preventing the formation of hydrocarbon-aluminum halide complex in said bed.

2. In the isomerization of a paraffinic hydrocarbon reactant wherein the reactant is commingled with a hydrogen halide promoter and subjected to isomerizing conditions in the presence of the promoter and an aluminum halide catalyst, the method which comprises passing at least a portion of said reactant, in liquid phase and prior to the commingling of the hydrogen halide promoter therewith, through a stationary bed of solid aluminum halide containing a metal selected from the group consisting of iron, aluminum, magnesium, tin, cadmium, nickel, copper and zinc, whereby to dissolve a portion of the solid aluminum halide in the liquid reactant while substantially preventing the formation of hydrocarbon-aluminum halide complex in said bed.

3. In the catalytic conversion of a saturated hydrocarbon reactant wherein the reactant is commingled with a hydrogen chloride promoter and subjected to conversion conditions in the presence of the promoter and an aluminum chloride catalyst, the method which comprises passing at least a portion of said reactant, in liquid phase and prior to the commingling of the hydrogen chloride promoter therewith, through a stationary bed of solid aluminum chloride containing a metal selected from the group consisting of iron, aluminum, magnesium, tin, cadmium, nickel, copper and zinc, whereby to dissolve a portion of the solid aluminum chloride in the liquid reactant while substantially preventing the formation of hydrocarbon-aluminum chloride complex in said bed.

4. In the isomerization of a paraffinic hydrocarbon reactant wherein the reactant is commingled with a hydrogen chloride promoter and subjected to isomerizing conditions in the presence of the promoter and an aluminum chloride catalyst, the method which comprises passing at least a portion of said reactant, in liquid phase and prior to the commingling of the hydrogen chloride promoter therewith, through a stationary bed of solid aluminum chloride containing a metal selected from the group consisting of iron, aluminum, magnesium, tin, cadmium, nickel, copper and zinc, whereby to dissolve a portion of the solid aluminum chloride in the liquid reactant while substantially preventing the formation of hydrocarbon-aluminum chloride complex in said bed.

5. In the alkylation of a paraffinic hydrocarbon reactant wherein the reactant is commingled with a hydrogen halide promoter and reacted with an alkylating agent in the presence of the promoter and an aluminum halide catalyst, the method which comprises passing at least a portion of said reactant, in liquid phase and prior to the commingling of the hydrogen halide promoter therewith, through a stationary bed of solid aluminum halide containing a metal selected from the group consisting of iron, aluminum, magnesium, tin, cadmium, nickel, copper and zinc, whereby to dissolve a portion of the solid aluminum halide in the liquid reactant while substantially preventing the formation of hydrocarbon-aluminum halide complex in said bed.

6. In the alkylation of a paraffinic hydrocarbon reactant wherein the reactant is commingled with a hydrogen chloride promoter and reacted with an alkylating agent in the presence of the promoter and an aluminum chloride catalyst, the method which comprises passing at least a portion of said reactant, in liquid phase and prior to the commingling of the hydrogen chloride promoter therewith, through a stationary bed of solid aluminum chloride containing a metal selected from the group consisting of iron, aluminum, magnesium, tin, cadmium, nickel, copper and zinc, whereby to dissolve a portion of the solid aluminum chloride in the liquid reactant while substantially preventing the formation of hydrocarbon-aluminum chloride complex in said bed.

JULIAN M. MAVITY.